US009477594B2

United States Patent
Kusano

(10) Patent No.: US 9,477,594 B2
(45) Date of Patent: Oct. 25, 2016

(54) SEMICONDUCTOR DEVICE AND CONTROL METHOD FOR READING INSTRUCTIONS

(71) Applicant: MegaChips Corporation, Osaka (JP)

(72) Inventor: Takao Kusano, Tokyo (JP)

(73) Assignee: MegaChips Corporation, Osaka (JP)

( * ) Notice: Subject to any disclaimer, the term of this patent is extended or adjusted under 35 U.S.C. 154(b) by 61 days.

(21) Appl. No.: 14/656,984

(22) Filed: Mar. 13, 2015

(65) Prior Publication Data
US 2015/0269072 A1 Sep. 24, 2015

(30) Foreign Application Priority Data

Mar. 20, 2014 (JP) .................................. 2014-057790

(51) Int. Cl.
*G06F 12/02* (2006.01)
*G06F 3/06* (2006.01)

(52) U.S. Cl.
CPC ......... *G06F 12/0246* (2013.01); *G06F 3/0613* (2013.01); *G06F 3/0659* (2013.01); *G06F 3/0679* (2013.01); *G06F 2212/1021* (2013.01); *G06F 2212/2022* (2013.01); *G06F 2212/7208* (2013.01); *Y02B 60/1225* (2013.01)

(58) Field of Classification Search
None
See application file for complete search history.

(56) References Cited

U.S. PATENT DOCUMENTS

| 6,516,409 | B1 * | 2/2003 | Sato | G06F 9/383 712/237 |
| 8,010,734 | B2 * | 8/2011 | Gong | G06F 12/0638 711/100 |
| 8,041,965 | B2 * | 10/2011 | Tani | G06F 1/26 713/300 |
| 8,645,727 | B2 * | 2/2014 | Tani | G06F 1/26 713/300 |
| 8,667,232 | B2 * | 3/2014 | De Santis | G06F 13/16 711/103 |
| 2003/0204675 | A1 * | 10/2003 | Dover | G06F 12/0862 711/137 |
| 2005/0273589 | A1 * | 12/2005 | Gong | G06F 12/0638 713/2 |
| 2009/0327650 | A1 * | 12/2009 | Neuerburg | G06F 9/322 711/219 |

FOREIGN PATENT DOCUMENTS

JP 2010-146142 A 7/2010

OTHER PUBLICATIONS

Margaret Rouse, "Program Counter", May 2012, pp. 1-11, http://whatis.techtarget.com/definition/program-counter.*
Webopedia, "Sequential Access", Aug. 9, 2002, pp. 1-2, https://web.archive.org/web/20020809134454/http://www.webopedia.com/TERM/S/sequential_access.html.*

* cited by examiner

*Primary Examiner* — Christopher D Birkhimer
(74) *Attorney, Agent, or Firm* — Osha Liang LLP

(57) ABSTRACT

A system-in-package semiconductor device with a CPU, a first flash memory configured to store first instructions to be executed by the CPU, and a second flash memory configured to store second instructions to be executed in accordance with a predetermined control instruction included in the first instructions. The semiconductor device determines, prior to the CPU executing the instruction, whether an instruction read out from the first flash memory is a branch instruction, and if it is determined to be the branch instruction, causes the second flash memory to perforin read-out operation using a branch destination address value indicated by the branch instruction, and if a value of a program counter of the CPU matches the branch destination address value, while the second flash memory is in a state of being ready for read-out operation in accordance with the instruction, starts reading out the second instructions from the second flash memory.

11 Claims, 6 Drawing Sheets

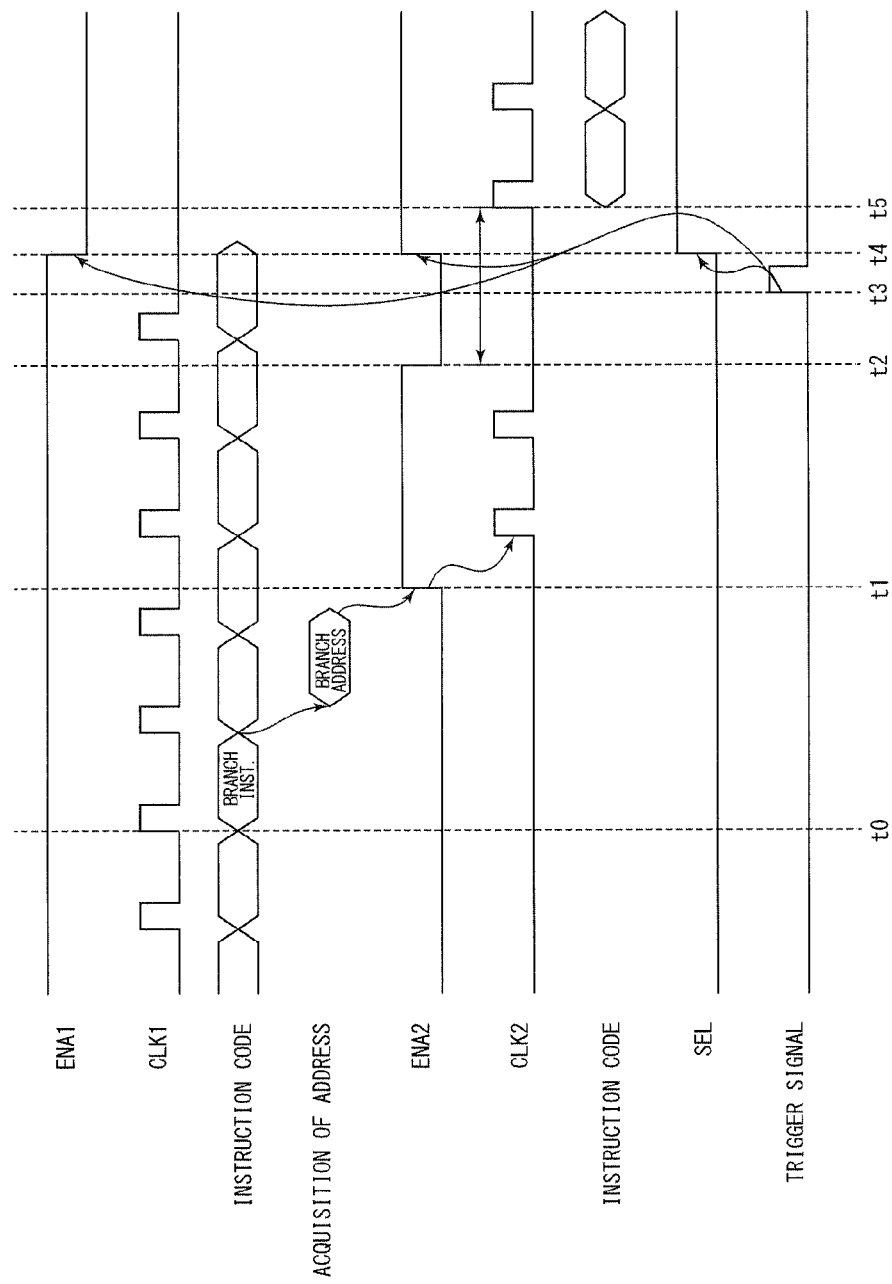

SEMICONDUCTOR DEVICE AND CONTROL METHOD FOR READING INSTRUCTIONS

CROSS REFERENCE TO RELATED APPLICATIONS

This application claims priority to Japanese Patent Application No. 2014-057790, filed on Mar. 20, 2014, which is hereby incorporated by reference in its entirety.

BACKGROUND OF INVENTION

1. Field of the Invention

The present invention generally relates to a semiconductor device and a control method for reading instructions, and more particularly to a system-in-package semiconductor device using a rewritable non-volatile memory and a control method for reading instructions in such a semiconductor device.

2. Background Art

In recent years, many rewritable non-volatile memories (e.g., flash memories) have been installed in an electronic circuit system. Flash memories are mainly classified into a NAND type and a NOR type. Typically, a NAND flash memory is suitable for dealing with a large volume of data because of large capacity and thus NAND flash memory is inexpensive in terms of price per bit, but it requires a controller and a RAM for shadowing, resulting in likely making a circuit configuration complicated. In contrast, although a NOR flash memory has small capacity and operates at a relatively lower speed, it is suitable for storing program codes (instruction codes) and firmware because of simple circuit configuration, and therefore there is also provided the specifications called XiP (eXecute-in-Place).

In general, a NOR flash memory includes a parallel type and a serial type. A NOR serial flash memory has a small number of pins and thus can achieve reduction in chip area, thereby enabling cost saving for implementation of a board. Therefore, the NOR serial flash memory, among others, and a system-in-package (SIP), in which such a memory is installed together with a CPU, is expected to be utilized in the future.

In addition, improvement of an operation speed of an electronic circuit system is constantly requested, and various techniques for improving such an operation speed have been proposed.

Japanese Patent Publication No. 2010-146142 (hereinafter the "publication") discloses a technique of reducing a time required for activating a program, such as an OS (operating system) in an information processing apparatus. Specifically, the publication discloses an information processing apparatus having two processors, namely: a first processor which reads out a plurality of instructions relating to the OS from a DRAM to execute preparation processing for enabling the OS to be executed (e.g., consistency check of kernel images held in the DRAM), a second processor which reads out a plurality of instructions relating to the OS from a flash memory and executes the instructions temporally parallel with execution of the preparation processing of the first processor, and further which switches a source of obtaining the instructions relating to the OS from the flash memory to the DRAM in response to completion of the preparation processing in order to continuously execute the OS.

In such conventional information processing apparatus disclosed in the publication as discussed above, a DRAM is used to store the instructions relating to the OS. Accordingly, it is necessary to make a circuit design taking into account wiring lines in accordance with a number of pins provided at the DRAM, and thus it is difficult to achieve a chip downsizing. That is, such an information processing apparatus is designed under the system policy, which enables use of a large-capacity, higher-speed DRAM in accordance with an increase of kernel image size as a result of the OS having higher functions, and thus such an information processing apparatus is unsuitable for a system environment in which a DRAM cannot be used or in which reduction in chip implementation area is strongly desired.

A NOR flash memory is often used to store instruction codes in a system environment, in which high reliability is desired because of its characteristics, and in which a technique for further improving a read-out speed has been desired. In this regard, a NOR serial flash memory is a promising memory which largely contributes to reduction in chip area because of a small number of I/O pins; however, as its read-out speed is lower than other flash memories, in a case where the NOR serial flash memory is installed in a system-in-package semiconductor device, the read-out speed becomes a bottleneck. In particular, when a CPU reads out an instruction regarding a branch from the NOR serial flash memory in order to execute the instruction, waiting occurs on the CPU because of its structure until read-out from the NOR serial flash memory is ready, and as a result of this, performance of the CPU deteriorates. In other words, with the NOR serial flash memory, if there is continuity between read-out addresses, data can be read out at a relatively high speed, whereas if there is no continuity between read-out addresses (e.g., there is an address jump by a branch instruction, a jump instruction, etc.), an overhead occurs during processing from when an address is designated until data is read out, disadvantageously causing the CPU to be held in abeyance during that period.

SUMMARY OF INVENTION

An object of the present invention is to provide an architecture which improves an instruction read-out speed in a system-in-package semiconductor device including a flash memory which stores instruction codes.

More specifically, an object of the present invention is to provide an architecture which achieves efficient execution of a CPU without putting the CPU into a hold state unnecessarily even when the CPU reads out and executes an instruction regarding branch in a system-in-package semiconductor device including a NOR serial flash memory which stores instruction codes.

The present invention for solving the problems as discussed above may be configured to include matters defining the invention or technical features.

According to one aspect of the present invention, a semiconductor device may include a CPU, a first flash memory configured to store a plurality of first instructions to be executed by the CPU, and a second flash memory configured to store a plurality of second instructions to be executed in accordance with a predetermined control instruction included in the first instructions. The semiconductor device may determine, before executing instructions by the CPU, whether an instruction read out from the first flash memory is a branch instruction, and, when determined to be the branch instruction, instruct the second flash memory to perform read-out operation using a branch destination address value indicated by the branch instruction. Further, if a value of a program counter of the CPU matches the branch destination address value while the second flash memory is in a state of being ready for the read-out operation in accordance with the instruction, the semiconductor device may start reading out the second instructions from the second flash memory.

Thus, even if there is no continuity between read-out addresses, by putting beforehand another flash memory different from the flash memory from which data is being read out, into a state of being ready for read-out operation, it is possible to reduce a waiting time of the CPU and thus provide efficient use of the CPU.

Further, according to another aspect of the present invention, a semiconductor device may include a first flash memory configured to store a plurality of first instructions, a second flash memory configured to store a plurality of second instructions to be executed in accordance with a predetermined control instruction included in the plurality of first instructions, an access control unit configured to control access to the first flash memory and the second flash memory, a memory interface configured to select one of the first flash memory and the second flash memory, and to provide an instruction sequentially read out from the selected flash memory to a CPU, the memory interface including an instruction detecting unit configured to determine whether the instruction is a first control instruction, and, when it is determined to be the first control instruction, to acquire a first jump destination address value indicated by the first control instruction, and a program counter monitoring unit configured to compare a value of a program counter of the CPU with the first jump destination address value acquired by the instruction detecting unit, and, when, as a result of the comparison the value of the program counter matches the first jump destination address value, to output a first trigger signal. The access control unit may perform control so as to cause the second flash memory to be in a state of being ready for read-out operation in accordance with the first jump destination address value acquired from the instruction detecting unit. The memory interface may select the second flash memory based on the first trigger signal output from the program counter monitoring unit.

The program counter monitoring unit may compare the value of the program counter with the first jump destination address value when the value of the program counter is rewritten to a value other than a predetermined increment value.

Further, the program counter monitoring unit may include a register configured to store the acquired first jump destination address value.

Still further, the program counter monitoring unit may perform control, so that the CPU is put into a hold state when the value of the program counter is rewritten to a value other than the predetermined increment value and a content of the register is null or void.

Further, the program counter monitoring unit may perform control, so that the CPU is released from the hold state when the second flash memory is in a state of being ready for read-out operation in accordance with an instruction decoded by the CPU.

Further, the access control unit may perform control so that the second flash memory is put into an idle state until the first trigger signal is received when the second flash memory is in the state of being ready for read-out operation.

Further, the instruction detecting unit may determine whether an instruction is a second instruction while the plurality of instructions are read out from the second flash memory, and may acquire a second jump destination address value indicated by the second instruction, if the instruction is determined to be the second instruction. Further, the access control unit may perform control, such that the first flash memory attains a state of being ready for read-out operation in accordance with the second jump destination address value acquired by the instruction detecting unit. Further, the program counter monitoring unit may compare the value of the program counter with the second jump destination address value acquired by the instruction detecting unit, and may output a second trigger signal when, as a result of the comparison, the value of the program counter matches the second jump destination address value. The memory interface may select the first flash memory based on the second trigger signal output from the program counter monitoring unit.

The semiconductor device may further include an interrupt controller configured to issue an interrupt to the CPU in response to an interrupt request signal from at least one of an external peripheral circuit and peripheral equipment. The interrupt controller may acquire an interrupt jump destination address value according to the interrupt based on the interrupt request signal. Further, the access control unit may perform control such that the second flash memory attains a state of being ready for read-out operation in accordance with the interrupt jump destination address value acquired by the interrupt controller. Furthermore, the program counter monitoring unit may compare the value of the program counter with the interrupt jump destination address value acquired by the interrupt controller, and may output the first trigger signal when, as a result of the comparison, the value of the program counter matches the interrupt jump destination address value. The memory interface may select the second flash memory based on the first trigger signal output from the program counter monitoring unit.

It should be noted that each of the first flash memory and the second flash memory may be a NOR serial flash memory.

Further, according to still another aspect of the present invention, a control method for reading instructions in a semiconductor device including a CPU, a first flash memory configured to store a plurality of first instructions to be executed by the CPU, and a second flash memory configured to store a plurality of second instructions to be executed in accordance with a predetermined control instruction included in the first instructions is provided. The control method includes selectively controlling the first flash memory to read out the first instructions in order and provide the first instructions to the CPU, detecting a predetermined control instruction among the first instructions while reading out the first instructions, acquiring a jump destination address value indicated by a predetermined control instruction if the predetermined control instruction is detected, performing control so as to cause the second flash memory to be in a state of being ready for read-out operation in accordance with the acquired jump destination address value, monitoring a program counter of the CPU to determine whether a value of the program counter matches the jump destination address value if the jump destination address value is acquired, outputting a predetermined trigger signal if the value of the program counter matches the jump destination address value, and switching read-out operation of instructions to be provided to the CPU from the first flash memory to the second flash memory which is put into a state of being ready for read-out operation based on the output predetermined trigger signal.

According to the present invention, it is possible to improve an instruction read-out speed in a system-in-package semiconductor device including a flash memory which stores instruction codes.

More specifically, according to the present invention, in a system-in-package semiconductor device including a NOR serial flash memory which stores instruction codes, even when a CPU reads out and executes an instruction regarding branch, it is possible to achieve efficient execution of the CPU without holding the CPU unnecessarily.

Other technical features, objects, and operational effects or advantages of the present invention will be clarified by the following embodiments described with reference to the accompanying drawings.

BRIEF DESCRIPTION OF DRAWINGS

FIG. 6 is a diagram illustrating an example of a timing chart illustrating switching operation of a semiconductor device according to one or more embodiments of the present invention.

DETAILED DESCRIPTION

Embodiments of the present invention will be described below with reference to the drawings. Note that the embodiments described below are merely examples, and are not intended to exclude application of various modifications and techniques which are not explicitly described below. Various modifications (e.g., combinations of the embodiments) can be made to the present invention without departing from the spirit of the present invention. Further, in the following description of the drawings, the same or similar references are assigned to the same or similar parts. The drawings are schematic and do not necessarily match an actual dimension, ratio, or the like. The relationship of dimensions or a ratio may be different between the drawings.

First Embodiment

Figure 1:
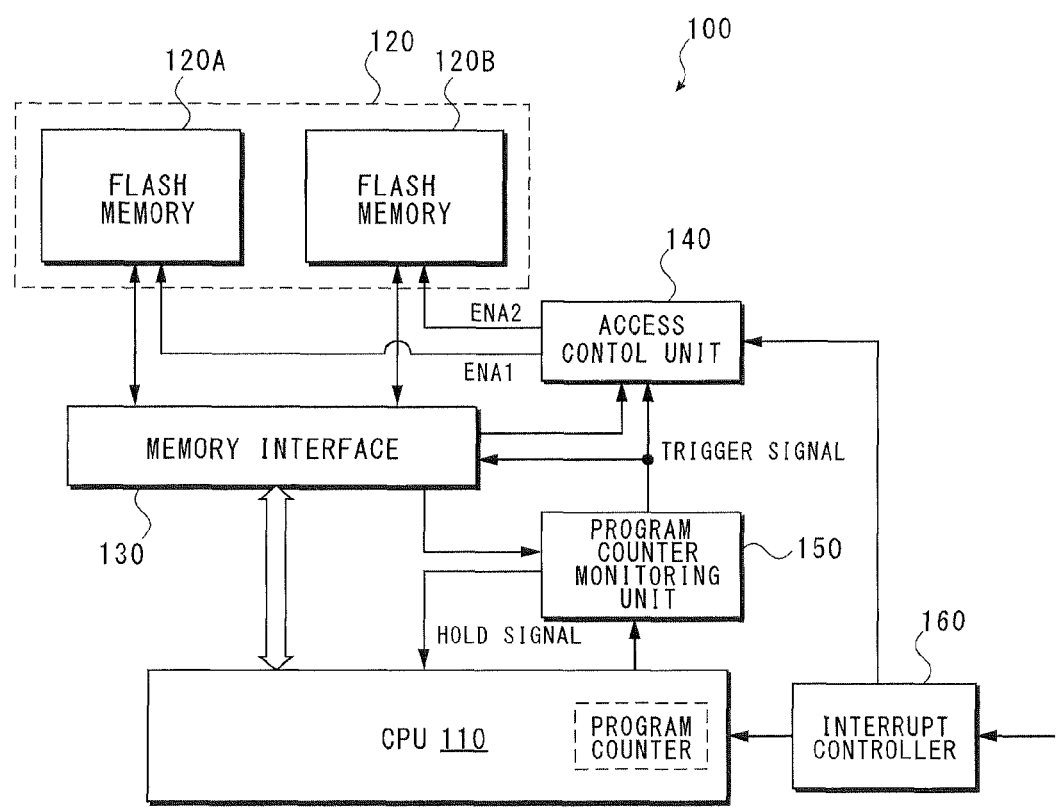
FIG. 1 is a block diagram for illustrating a schematic configuration of a semiconductor device according to one or more embodiments of the present invention.

FIG. 1 is a block diagram illustrating a schematic configuration of a semiconductor device arranged in accordance with one or more embodiments of the present invention. As shown in FIG. 1, a semiconductor device 100 may include, for example, a CPU 110, a memory module 120, a memory interface (hereinafter, referred to as a "memory I/F") 130, an access control unit 140, a program counter monitoring unit (hereinafter, referred to as a "PC monitoring unit") 150, and an interrupt controller 160. Typically, the semiconductor device 100 may be a system-in-package ("SIP") in which these various components are integrally packaged.

The CPU 110 may be a component which executes processing by interpreting a plurality of instruction codes (hereinafter, referred to as "instructions") described as a program. The term "CPU" may be used as a synonym for a processor meaning a processing device, an MPU, a main processor, a micro controller, or the like, or otherwise may mean a multi-core processor. The CPU 110 may include, for example, an arithmetic circuit, a decoder, various registers, and a program counter (see FIG. 3). The CPU 110 may further include a cache memory. The CPU 110 may be a general-purpose register type or an accumulator type, or any other type. The CPU 110 may be operatively connected to the memory I/F 130 via an instruction bus and a data bus.

Figure 2:
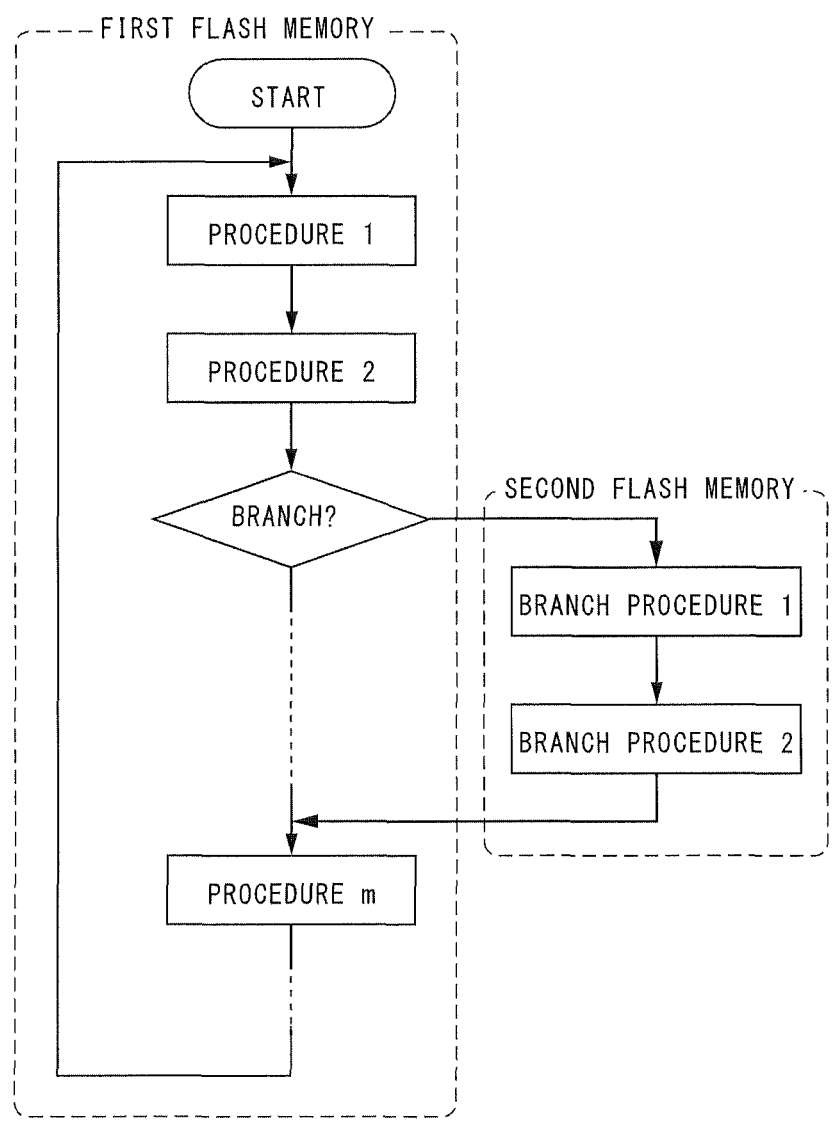
FIG. 2 is a diagram schematically illustrating a plurality of instructions stored in a memory module of a semiconductor device according to one or more embodiments of the present invention.

The memory module 120 may include at least two or more rewritable non-volatile memories which can operate independently from each other. An example of the memory module 120 of the present embodiment may be a NOR flash memory, more specifically, a NOR serial flash memory. In this example, the memory module 120 may include a first NOR serial flash memory (hereinafter, referred to as a "first flash memory") 120A, and a second NOR serial flash memory (hereinafter, referred to as a "second flash memory") 120B. The first flash memory 120A and the second flash memory 120B may store the plurality of instructions to be executed by the CPU 110. Specifically, in the present embodiment, the first flash memory 120A may store a plurality of first instructions constituting a main routine, and the second flash memory 120B may store a plurality of second instructions constituting a branch routine to be executed in accordance with a control instruction regarding branch included in the first instructions. FIG. 2 is a diagram schematically illustrating a plurality of instructions stored respectively in the first flash memory 120A and the second flash memory 120B. The first flash memory 120A and the second flash memory 120B can be put into a state of being ready for read-out operation in accordance with a predetermined enable signal.

It should be noted that the memory module 120 may include a NAND flash memory in addition to the NOR serial flash memory, or may include a volatile memory (e.g., a DRAM).

The memory I/F 130 may be an interface circuit arranged between the CPU 110 and the memory module 120. Specifically, the memory I/F 130 may store an instruction read out from the memory module 120 in accordance with a predetermined clock in a FIFO buffer (prefetch buffer), and, then, convert the instruction into a data format adapted for an instruction bus of the CPU 110, and provide with the instruction to the CPU 110. That is, in this example, as the first flash memory 120A and the second flash memory 120B may be serial types, the memory I/F 130 may convert a data sequence constituting an instruction output in a serial type into a data sequence in a parallel type and provide the data sequence to the CPU 110. In this case, the instruction may typically be output in a pipeline system. Although not illustrated, a data sequence constituting "program data" may be converted into a predetermined data format, and provided to the CPU 110 via the data bus. As will be described later, the memory I/F 130 in the present embodiment may pre-decode the instruction at the stage where the instruction is stored in the prefetch buffer, and detect whether there is a branch instruction therein. Further, as will be described later, the memory I/F 130 in the present embodiment may switch an I/O signal line at a predetermined timing based on the detection result so that one of the first flash memory 120A and the second flash memory 120B may be selected.

The access control unit 140 may be a circuit which may control access to the memory module 120. Specifically, the access control unit 140 may perform control so that at least one of the first flash memory 120A and the second flash memory 120B is put into a state of being ready for read-out operation depending on a value indicating a designated predetermined address. Further, the access control unit 140 may perform control so that a data sequence (i.e., instruction) may be read out from at least one of the first flash memory 120A and the second flash memory 120B which is in a state of being read-out operation.

The PC monitoring unit 150 may monitor a program counter 115 (see FIG. 3) of the CPU 110, and, when a value of the program counter 115 changes in accordance with a branch instruction or the like, compare a value indicating a branch destination address (jump destination address) (hereinafter, referred to as a "branch destination address value") indicated by the branch instruction detected at the memory I/F 130 with the value of the program counter 115. The PC monitoring unit, when the branch destination address value matches the value of the program counter 115, may output a predetermined trigger signal. The output predetermined trigger signal may be input to, for example, the memory I/F 130 and the access control unit 140.

The interrupt controller 160 may be a circuit which may receive an interrupt request signal provided from a peripheral circuit or equipment which is not illustrated and make a predetermined interrupt to the CPU 110. Specifically, the interrupt controller 160 may rewrite the program counter of the CPU 110 with a designated interrupt address value in accordance with an operation timing of the CPU 110 depending on the content of the interrupt request signal, thereby making control of the CPU 110 jump to the interrupt address. Upon receipt of the interrupt request signal, the interrupt controller 160 of the present embodiment may outputs a value indicating a jump destination address (hereinafter, referred to as a "jump destination address value") in accordance with the interrupt request signal to the access control unit 140. In this case, the interrupt controller 160 may output the jump destination address value to the access control unit 140 prior to an interrupt timing to the CPU 110. The access control unit 140 may perform control so that at least one of the first flash memory 120A and the second flash memory 120B is put into a state of being ready for read-out operation in accordance with the jump destination address value.

It should be noted that while, in the present embodiment, the interrupt controller 160 may be configured to output the jump destination address value to the access control unit 140, and, then, make an interrupt to the CPU 110, it is also possible to provide an interrupt detection circuit configured to detect an interrupt request signal transmitted from a peripheral circuit or the like, and to output the jump destination address value to the access control unit 140, separately from the conventional interrupt controller which makes an interrupt to the CPU 110. That is, in response to an interrupt request signal, the interrupt detection circuit may output the jump destination address value to the access control unit 140 at a first timing indicated by a predetermined operation clock first, and, then, the interrupt controller 160 makes an interrupt to the CPU 110 at a second timing indicated by the predetermined operation clock. In this way, by sharing the operation clock between the interrupt detection circuit and the interrupt controller 160, the interrupt detection circuit may notify the access control unit 140 of the jump destination address value in accordance with the interrupt request at a timing prior to interrupt made by the interrupt controller 160 to the CPU 110.

Figure 3:
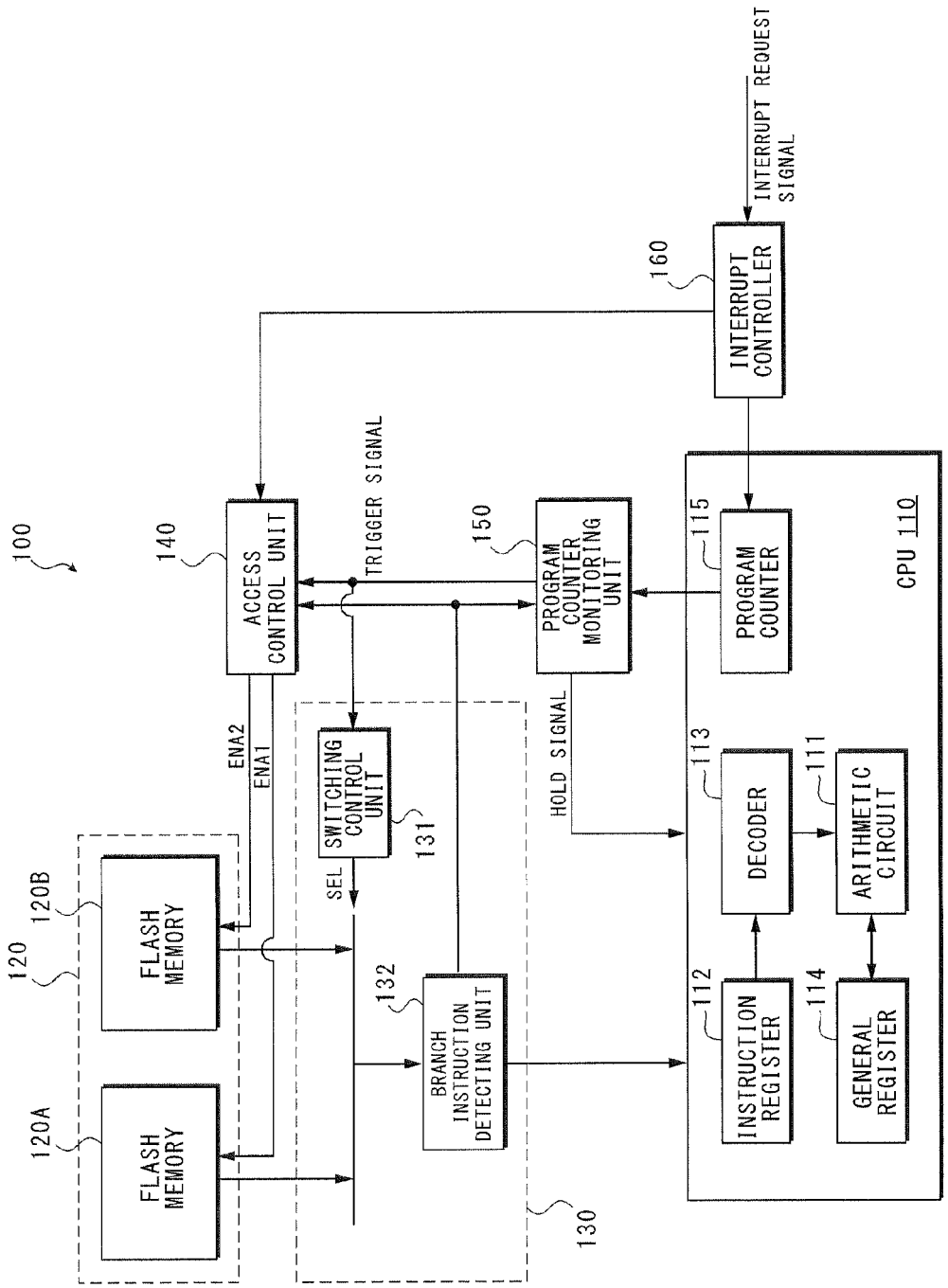
FIG. 3 is a block diagram illustrating an example of a functional configuration of a semiconductor device according to one or more embodiments of the present invention.

FIG. 3 is a block diagram illustrating an example of a functional configuration of a semiconductor device arranged in accordance with one or more embodiments of the present invention. In FIG. 3, in order to explain a more detailed functional configuration of the semiconductor device as shown in FIG. 1, a configuration of the memory I/F 130 may be illustrated in detail. That is, as explicitly shown in FIG. 3, the memory I/F 130 of the present embodiment may include, for example, a switching control unit 131, and a branch instruction detecting unit 132. Further, in the CPU 110, an arithmetic circuit 111, an instruction register 112, a decoder 113, a general register 114 and a program counter 115 are particularly illustrated.

The switching control unit 131 may be a circuit configured to switch an I/O signal line so that one of the first flash memory 120A and the second flash memory 120B is selected. Such switching control may be performed, for example, based on a predetermined trigger signal output from the PC monitoring unit 150. A data sequence read out from the selected flash memory in a serial manner may be provided to the branch instruction detecting unit 132.

The branch instruction detecting unit 132 which may include, for example, a prefetch buffer (not shown), may convert the data sequence read out from the selected flash memory into data (i.e., instructions) in a parallel format, while buffering the data sequence in the prefetch buffer, and output the data to an instruction bus of the CPU 110. The instructions output from the branch instruction detecting unit 132 may be fetched in an instruction register of the CPU 110. Further, during the buffering, the branch instruction detecting unit 132 may pre-decode the buffered data sequence to determine whether the instructions include a specific instruction (e.g., a branch instruction, a subroutine instruction, or the like), and, if determined that the instructions include, for example, a branch instruction, the branch instruction detecting unit 132 may acquire a branch destination address value indicated by the branch instruction and output the branch destination address value to the access control unit 140 and the PC monitoring unit 150.

It should be noted that the branch instruction detecting unit 132 may detect a branch instruction for performing control for branching from a main routine to a branch routine as described above while a data sequence may be sequentially read out from the first flash memory 120A, whereas the branch instruction detecting unit 132 may detect a predetermined instruction for performing control for recovering from the branch routine to the main routine while a data sequence may be sequentially read out from the second flash memory 120B after the flash memory may be switched to the second flash memory 120B. That is, the branch instruction detecting unit 132 may output a predetermined instruction for performing control for returning to the main routine to the access control unit 140 and the PC monitoring unit 150.

Figure 4:
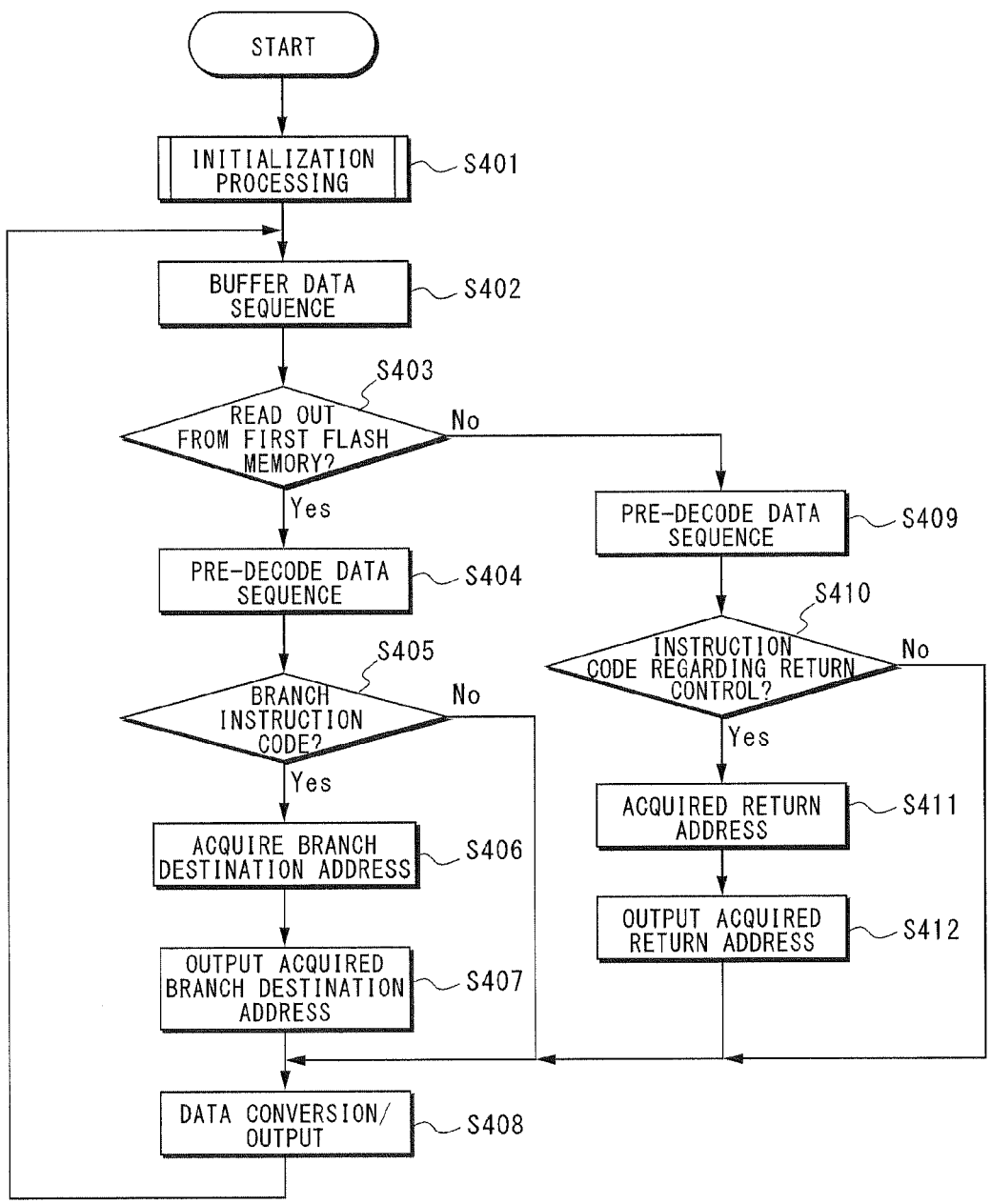
FIG. 4 is a flowchart illustrating operation of a memory interface of a semiconductor device according to one or more embodiments of the present invention.

FIG. 4 is a flowchart illustrating operation of a memory I/F of a semiconductor device arranged in accordance with one or more embodiments of the present invention.

First, when activated, the semiconductor device 100 may check operation of each component as initialization processing, and then, the switching control unit 131 may select an I/O signal line of the first flash memory 120A (S401). In this state, as read-out from the first flash memory 120A may become ready, the CPU 110 may perform control so that sequential read-out of a data sequence from the first flash memory 120A may be started in accordance with the value of the program counter 115.

When the data sequence is read out from the first flash memory 120A, the memory I/F 130 may buffer the data sequence in the prefetch buffer (S402). The branch instruction detecting unit 132 may perform different processing as set forth below depending on whether the data sequence is read out from the first flash memory 120A or read out from the second flash memory 120B.

Specifically, if it is determined that the data sequence is read out from the first flash memory 120A (S403: Yes), the branch instruction detecting unit 132 may pre-decode the data sequence (i.e., instruction) (S404). As a result of the pre-decoding, if it is determined that the instruction is not a branch instruction (S405: No), the branch instruction detecting unit 132 may convert the data sequence into a predetermined data format adapted for the instruction bus and output the data sequence to the instruction register 112 of the CPU 110 at a predetermined timing (S408).

As a result of the pre-decoding, if it is determined that the instruction is a branch instruction (S405: Yes), the branch instruction detecting unit 132 may acquire a branch destination address value indicated by the branch instruction (S406), and output the acquired branch destination address value to the access control unit 140 and the PC monitoring unit 150 (S407). The branch instruction detecting unit 132 may convert the data sequence into a predetermined data format adapted for the instruction bus and outputs the data sequence to the instruction register of the CPU 110 (S408).

In contrast, if it is determined that the data sequence is not read out from the first flash memory 120A, namely, read out from the second flash memory 120B (S403: No), the branch instruction detecting unit 132 may pre-decode the data sequence (instruction) in a similar manner (S409) to determine whether the data sequence is an instruction regarding recovery control (S410). As a result of the pre-decoding, upon determining that the instruction is not an instruction regarding return control (S410: No), the branch instruction detecting unit 132 may convert the data sequence into a predetermined data format adapted for the instruction bus and output the data sequence to the instruction register 112 of the CPU 110 at a predetermined timing (S408).

As a result of the pre-decoding, upon determining that the instruction is an instruction regarding recovery control (S410: Yes), the branch instruction detecting unit 132 may acquire a return destination address value (e.g., a jump destination address value) indicated by the instruction (S411), and output the acquired return destination address to the access control unit 140 and the PC monitoring unit 150 (S412). The branch instruction detecting unit 132 may convert the data sequence into a predetermined data format adapted for the instruction bus and output the data sequence to the instruction register of the CPU 110 (S408).

It should be noted that the branch instruction detecting unit 132 may detect only a specific branch instruction from which a branch destination address value can be acquired from among branch instructions. Specifically, the branch instruction detecting unit 132 may simply provide a branch instruction from which a branch destination address value cannot be acquired to the CPU 110 in a similar manner to other instructions. An example of the branch instruction from which a branch destination address value cannot be acquired may include a register indirect branch instruction for which a branch destination address is determined upon execution of the CPU 110.

Figure 5:
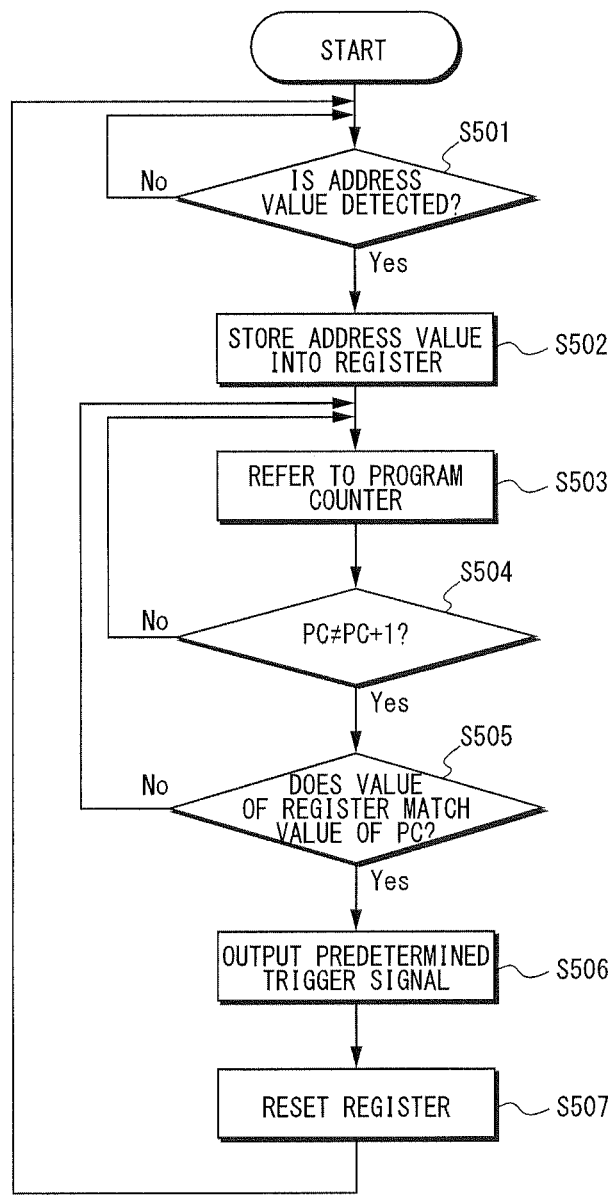
FIG. 5 is a flowchart illustrating operation of a program counter monitoring unit of a semiconductor device according to one or more embodiments of the present invention.

FIG. 5 is a flowchart illustrating operation of a program counter monitoring unit of a semiconductor device according to one or more embodiments of the present invention.

As illustrated in FIG. 5, the PC monitoring unit 150 may monitor first whether a predetermined address value (e.g., a branch destination address value) is transmitted from the branch instruction detecting unit 132 (S501). If the PC monitoring unit 150 detects that the branch destination address value is transmitted (S501: Yes), the PC monitoring unit 150 may store the branch destination address value in a register (S502), and be put into a mode for monitoring the program counter 115 (S503 to S504). In other words, the PC monitoring unit 150 may refer to the program counter 115 (S503) to determine whether a value of the program counter 115 is rewritten with a value other than a normal increment value (e.g., "1") (S504). A case where the value of the program counter 115 is rewritten with a value other than a normal increment value may mean, for example, a case where a branch destination address value is set (PC#PC+1). If the PC monitoring unit 150 determines that the value of the program counter 115 is rewritten with a value other than a normal increment value (S504: Yes), the PC monitoring unit 150 may further determine whether the branch destination address value stored in the register matches the value of the program counter 115 (S505). If the PC monitoring unit 150 determines that the branch destination address value stored in the register matches the value of the program counter 115 (S505: Yes), the PC monitoring unit 150 may output a predetermined trigger signal to the switching control unit 131 and the access control unit 140 (S506). By way of this, a source from which a data sequence is read out may be switched from the first flash memory 120A to the second flash memory 120B. Subsequently, the PC monitoring unit 150 may reset the register (S507) and becomes ready for the subsequent monitoring operation (S501).

The PC monitoring unit 150 may also perform the processing similar to the above processing if detecting that an address value regarding recovery control is transmitted from the branch instruction detecting unit 132.

Returning to FIG. 3, operation of switching from the first flash memory 120A to the second flash memory 120B in the semiconductor device 100 will be described below.

First, after the semiconductor device 100 may be initialized, the access control unit 140 may provide an enable signal ENA 1 to the first flash memory 120A and perform control so that a clock CLK 1 (not illustrated) is provided to the first flash memory 120A and read-out of a data sequence from a predetermined address (e.g., an address indicated by the program counter 115) of the first flash memory 120A becomes ready. In this state, the switching control unit 131 may select an I/O signal line of the first flash memory 120A, so that read-out of a data sequence from the first flash memory 120A may be started in accordance with the value of the program counter 115.

If the data sequence read out from the first flash memory 120A is buffered in the prefetch buffer, the branch instruction detecting unit 132 may perform pre-decoding to determine whether there is a branch instruction. Upon determining that the pre-decoded instruction is an instruction other than the branch instruction, the branch instruction detecting unit 132 may provide the instruction to the CPU 110 via the instruction bus, so that the instruction may be stored in the instruction register 112 of the CPU 110. In contrast, if determining that the pre-decoded instruction is a branch instruction, the branch instruction detecting unit 132 may provide the branch instruction to the CPU 110 and acquire a branch destination address value indicated by the branch instruction and output the branch destination address value to the access control unit 140 and the PC monitoring unit 150.

Upon receipt of the branch destination address value, the access control unit 140 may perform control so that a clock CLK 2 (not illustrated) is provided to the second flash memory 120B by providing an enable signal ENA 2, and perform control so that read-out of a data sequence from a position of the branch destination address of the second flash memory 120B becomes ready. Upon receipt of, for example, a READY signal (not illustrated) from the second flash memory 120B and detecting that read-out from the second flash memory 120B becomes ready, the access control unit 140 may stop providing the enable signal ENA 2 and put the second flash memory 120B into an idle state until the CPU 110 is ready. By putting the second flash memory 120B into the idle state, it is possible to stop providing an unnecessary clock and thus to save power consumption of the semiconductor device 100.

Further, in parallel with the operation of the access control unit 140, the PC monitoring unit 150 may temporarily store the branch destination address in a register (not shown).

In the CPU 110, typically, when the instruction provided from the branch instruction detecting unit 132 via the instruction bus is stored in the instruction register 112, the instruction may be sequentially decoded by the decoder 113, for example, using a pipeline system, and thereby the arithmetic circuit 111 may execute predetermined operation based on an interpretation result by the decoder 113 and a value of the general register 114, so that desired processing can be achieved. Every time decoding is performed by the decoder 113, the value of the program counter 115 may be sequentially incremented (i.e., PC=PC+1). If the decoder 113 determines that the instruction is a branch instruction, a branch destination address indicating the branch instruction may be set at the program counter 115 (i.e., PC#PC+1).

The value of the program counter 115 may be monitored by the PC monitoring unit 150. Specifically, the PC monitoring unit 150 may monitor whether the branch destination address value is set at the program counter 115 or whether the branch destination address value received from the branch instruction detecting unit 132 matches the value of the program counter 115. Upon determining that the branch destination address value is set at the program counter 115 and that the branch destination address value received from the branch instruction detecting unit 132 matches the value of the program counter 115, the PC monitoring unit 150 may output a predetermined trigger signal to the switching control unit 131 and the access control unit 140 and reset content of the register. In response to this, the switching control unit 131 may switch the I/O signal line from the first flash memory 120A to the second flash memory 120B. Further, the access control unit 140 may stop providing the enable signal ENA 1 to the first flash memory 120A and restart providing the enable signal ENA 2 to the second flash memory 120B which is in a state of being a ready for read-out operation. By way of this, the provision of the clock CLK 2 to the second flash memory 120B may be restarted, and instructions of a branch routine according to the branch destination address may be sequentially read out immediately from the second flash memory 120B.

When the branch instruction detecting unit 132 detects a branch instruction from which a branch destination address cannot be acquired, the branch instruction detecting unit 132 may simply provide the instruction to the CPU 110 in a similar manner to other normal instructions. In the CPU 110, in decoding by the decoder 113 a branch instruction from which a branch destination address value cannot be acquired, a value in accordance with the decoding may be set at the program counter 115. That is, the value of the program counter 115 may be rewritten with a value other than a normal increment value (i.e., PC#PC+1). Meanwhile, the PC monitoring unit 150 may detect that a value other than a normal increment value is set as the value of the program counter 115. In this case, the content of the register may be Null, and thus the branch destination address value may not be stored. Accordingly, the PC monitoring unit 150 may output a HOLD signal to the CPU 110 and holds operation of the CPU 110 in abeyance until the flash memory attains a state of being ready for read-out operation in accordance with the branch destination address value. Further, the PC monitoring unit 150 may output the value of the program counter 115 to the access control unit 140, while outputting a predetermined trigger signal to the switching control unit 131. In response to this, the access control unit 140 may perform control immediately so that the second flash memory 120B operates and the first flash memory 120A stops operation, and accordingly the switching control unit 131 may switch the I/O signal line from the first flash memory 120A to the second flash memory 120B.

When a data sequence is read out from the second flash memory 120B and an instruction corresponding to the branch destination address value is buffered as described above, the branch instruction detecting unit 132 may output, for example, a READY signal to the PC monitoring unit 150. In response to this, the PC monitoring unit 150 may stop outputting the HOLD signal for the CPU 110 to restart the operation of the CPU 110. By way of this, the instruction provided from the branch instruction detecting unit 132 may be decoded at the CPU 110, and thus the operation is executed.

FIG. 6 is a diagram illustrating an example of a timing chart for illustrating switching operation of a semiconductor device according to one or more embodiments of the present invention.

As shown in FIG. 6, it is assumed that a data sequence (instruction) may be read out from the first flash memory 120A in accordance with the clock CLK 1. In this state, for example, if the branch instruction detecting unit 132 detects a branch instruction (time t0), the branch instruction detecting unit 132 may acquire a branch destination address value indicated by the branch instruction and output this branch destination address value to the access control unit 140 and the PC monitoring unit 150. Meanwhile, the branch instruction detecting unit 132 may provide the data sequence to the CPU 110 via the instruction bus while converting the data sequence into a predetermined data format using a pipeline method.

Upon receipt of the branch destination address value, the access control unit 140 may set the enable signal ENA 2 at "H" (time W. By this, provision of a clock CLK 2 to the second flash memory 120B may be started, and the second flash memory 120B may start operation so as to be able to read out a data sequence from the position indicated by the branch destination address.

When the second flash memory 120B attains a state of being ready for read-out operation, for example, the second flash memory 120B may output a READY signal (not shown). In response to this, the access control unit 140 may set the enable signal ENA 2 at "L" and put the second flash memory 120B into an idle state while keeping the state of the second flash memory 120B ready for read-out operation (time t2).

The instruction provided to the CPU 110 may be sequentially decoded and thus operation may be executed, and in accordance with this, the value of the program counter 115 may be incremented by 1, so that the address value read out from the memory module 120 may be updated. When the branch instruction is decoded by the decoder 113, the branch destination address value may be set at the program counter 115. Upon determining that the branch destination address value received from the branch instruction detecting unit 132 matches the value of the program counter 115, the PC monitoring unit 150 may output a predetermined trigger signal to the switching control unit 131 and the access control unit 140 (time t3).

Upon detecting the predetermined trigger signal, the switching control unit 131 may output a selection signal SEL and switch the I/O signal line from the first flash memory 120A to the second flash memory 120B (time t4). In a substantially simultaneous and parallel manner, the access control unit 140 may set the enable signal ENA 1 for the first flash memory 120A at "L" and set the enable signal ENA 2 for the second flash memory 120B at "H." By way of this, provision of the clock CLK 1 to the first flash memory 120A may be stopped and provision of the clock CLK 2 to the second flash memory 120B may be started, so that instructions of a branch routine may be read out from the second flash memory 120B (time t5).

As described above, according to the present embodiment, for example, two flash memories which store instruction codes and which can be selectively switched may be provided, and the memory I/F 130 may detect a specific instruction from data read out from one of the flash memories before the CPU 110 executes the operation, and in response to this, the access control unit 140 may perform preparation of read-out from another flash memory, so that the subsequent instruction can be read out from the other flash memory immediately at a time point at which the CPU 110 executes the operation of the specific instruction. That is, even if there is no continuity between the read-out addresses, by putting beforehand another flash memory different from the flash memory from which data is being reading out into a state of being ready for read-out operation, it is possible to reduce a waiting time of the CPU and provide efficient use of the CPU.

Second Embodiment

The present embodiment discloses a technique for performing switching control between the first flash memory 120A and the second flash memory 120B in accordance with a subroutine instruction in the semiconductor device 100. In the following description, an example will be described with reference to FIG. 3 where the branch instruction detecting unit 132 may detect a subroutine instruction in place of the branch instruction, or in addition to the branch instruction, so that switching control of the flash memories may be performed.

In the present embodiment, for example, the first flash memory 120A may store a plurality of first instructions constituting a main routine, whereas the second flash memory 120B may store a plurality of third instructions constituting a subroutine executed according to a subroutine instruction included in the first instructions, in place of a plurality of second instructions constituting a branch routine, or in addition to the second instructions.

As described above, when the semiconductor device 100 is initialized, the access control unit 140 may perform control so that a clock CLK 1 (not shown) is provided to the first flash memory 120A by providing an enable signal ENA 1 to the first flash memory 120A, and perform control so that a data sequence can be read out from a predetermined address (for example, an address indicated by the program counter 115) of the first flash memory 120A. In this state, the switching control unit 131 may select an I/O signal line of the first flash memory 120A so that read-out of the data sequence from the first flash memory 120A is started.

When the data sequence read out from the first flash memory 120A is buffered in a prefetch buffer, the branch instruction detecting unit 132 may perform pre-decoding to determine whether there is a subroutine instruction. Upon determining that the pre-decoded instruction is an instruction other than a subroutine instruction (and a branch instruction), the branch instruction detecting unit 132 may provide the instruction to the CPU 110 via an instruction bus, thereby the instruction may be held at the instruction register 112 of the CPU 110. In contrast, when determining that the pre-decoded instruction is a subroutine instruction, the branch instruction detecting unit 132 may provide the subroutine instruction to the CPU 110 and acquire a jump destination address value indicated by the subroutine instruction and output this jump destination address value to the access control unit 140 and the PC monitoring unit 150.

Upon receipt of the jump destination address value, the access control unit 140 may perform control so that a clock CLK 2 (not shown) is provided to the second flash memory 120B by providing an enable signal ENA 2 and perform control so that a data sequence can be read out from the jump destination address of the second flash memory 120B. Upon receipt of, for example, a READY signal (not shown) from the second flash memory 120B and detecting that the second flash memory 120B attains a state of being ready for read-out operation, the access control unit 140 may put the second flash memory 120B into an idle state once transitorily. Meanwhile, the PC monitoring unit 150 may temporarily store the jump destination address value in a register (not shown).

In the CPU 110, when the subroutine instruction is decoded by the decoder 113, a return destination address value of the subroutine (i.e., PC=PC+1) may be stacked at the program counter 115 in accordance with a stack pointer, and, further, the jump destination address value indicated by the subroutine instruction may be stacked.

Upon detecting that the jump destination address value is set at the program counter 115, the PC monitoring unit 150 may determine whether the jump destination address value received from the branch instruction detecting unit 132 matches the value of the program counter 115. Namely, when determining that the jump destination address value is set at the program counter 115 and that the jump destination address value received from the branch instruction detecting unit 132 matches the value of the program counter 115, the PC monitoring unit 150 may output a predetermined trigger signal to the switching control unit 131 and the access control unit 140. Further, the PC monitoring unit 150 may store the return destination address value of the subroutine in the register in accordance with the stack pointer of the program counter 115.

Upon receipt of the predetermined trigger signal, the switching control unit 131 may switch an I/O signal line from the first flash memory 120A to the second flash memory 120B. Further, the access control unit 140 may stop provision of an enable signal ENA 1 to the first flash memory 120A and restart provision of an enable signal ENA 2 to the second flash memory 120B which can be put into an idle state. By way of this, provision of the clock CLK 2 to the second flash memory 120B may be restarted, and instructions of a subroutine according to the jump destination address value may be sequentially read out from the second flash memory 120B immediately.

Upon detecting a return instruction indicating completion of the subroutine from the data sequence read out from the second flash memory 120B, the branch instruction detecting unit 132 may output a return signal to the PC monitoring unit 150. Upon receipt of the return signal, the PC monitoring unit 150 may output the recovery destination address value stored in the register to the access control unit 140.

Upon receipt of the recovery destination address value, the access control unit 140 may perform control so that a clock CLK 1 is provided to the first flash memory 120A by providing an enable signal ENA 2 and perform control so that a data sequence can be read out from a position of the return destination address of the first flash memory 120A. Upon receipt of, for example, a READY signal from the first flash memory 120A and detecting that the first flash memory 120A attains a state of being ready for read-out operation, the access control unit 140 may put the first flash memory 120A into an idle state.

In the CPU 110, when the return instruction is decoded by the decoder 113, a return address of the subroutine may be set at the value of the program counter 115 in accordance with the stack pointer. Thus, the PC monitoring unit 150 may detect that the return destination address value stored in the register matches the value of the program counter 115, may output a predetermined trigger signal to the switching control unit 131 and the access control unit 140 and reset the content of the register.

Upon receipt of the predetermined trigger signal, the switching control unit 131 may switch the I/O signal line from the second flash memory 120B to the first flash memory 120A. Further, the access control unit 140 may stop provision of the enable signal ENA 2 to the second flash memory 120B and restart provision of the enable signal ENA 1 to the first flash memory 120A which can be put into an idle state. Thus, provision of the clock CLK 1 to the first flash memory 120A may be restarted, and instructions according to the return address may be sequentially read out from the first flash memory 120A immediately, in accordance with the value of the program counter 115.

It should be noted that in the present embodiment, a value subsequent to the current value of the program counter 115 may be used as the return destination address value for returning from the subroutine, but the value is not limited to this. There is a case where an exceptional return destination address may be designated depending on a subroutine, and such an address value may be stacked at the program counter 115.

As described above, according to the present embodiment, the same advantages or effects as those in the above-described first embodiment may be provide. Among others, according to the present embodiment, for example, two flash memories which store instruction codes and which can be selectively switched may be provided, and the memory I/F 130 may detect a specific instruction (subroutine instruction) from data read out from one of the flash memories before the CPU 110 executes the operation, and, in response to this, the access control unit 140 may perform preparation of read-out from another flash memory, so that the subsequent instruction can be read out from the other flash memory immediately at the time point at which the CPU 110 may execute the operation of the specific instruction. Further, according to the present embodiment, a return instruction may be detected before the CPU 110 may execute the operation, and in response to this, read-out operation from the original flash memory may be prepared, so that the subsequent instruction can be read out from a position of the return destination address of the other flash memory immediately at the time point at which the CPU 110 may execute the operation of the return instruction.

Third Embodiment

The present embodiment discloses a technique of performing switching control between the first flash memory 120A and the second flash memory 120B in accordance with occurrence of an interrupt to the CPU in the semiconductor device 100. In the following description, an example will be described with reference to FIG. 3, where switching control of the flash memories may be performed upon detecting occurrence of an interrupt to the CPU by the interrupt controller 160.

In the present embodiment, for example, the first flash memory 120A may store a plurality of first instructions constituting a main routine, whereas the second flash memory 120B may store a plurality of fourth instructions constituting an interrupt routine, in place of a plurality of second instructions constituting a branch routine and/or a plurality of third instructions constituting a subroutine, or in addition to the second instructions and/or the third instructions.

As described above, it is assumed that a data sequence may be read out from the first flash memory 120A. In this state, when an interrupt request signal may be output from an external peripheral device or the like, the interrupt controller 160 may detect this interrupt request signal and then output an interrupt jump destination address based on the interrupt request signal to the access control unit 140. Upon receipt of the interrupt jump destination address, the access control unit 140 may perform control so that a clock CLK 2 (not shown) may be provided to the second flash memory 120B by providing an enable signal ENA 2 and perform control so that a data sequence can be read out from the interrupt jump destination address of the second flash memory 120B. Upon detecting that the second flash memory 120B attains a state of being ready for read-out operation by receiving, for example, a READY signal (not shown) from the second flash memory 120B, the access control unit 140 may put the second flash memory 120B into an idle state. Further, the PC monitoring unit 150 may temporarily stores the jump destination address value in a register (not shown).

In the CPU 110, when an interrupt is made by the interrupt controller 160, a return destination address value of an interrupt routine according to the interrupt (i.e., PC=PC+1) may be stacked at the program counter 115 in accordance with a stack pointer, and, further, a jump destination address value indicated by the interrupt routine may be stacked. Further, the interrupt controller 160 may output the jump destination address value according to the interrupt to the PC monitoring unit 150.

Upon detecting that the jump destination address value is set at the program counter 115, the PC monitoring unit 150 may determine whether the jump destination address value stored in the register matches the value of the program counter 115. Upon detecting that the jump destination address value is set at the program counter 115 and also that the jump destination address value received from the branch instruction detecting unit 132 matches the value of the program counter 115, the PC monitoring unit 150 may output a predetermined trigger signal to the switching control unit 131 and the access control unit 140 and may store a return destination address value for recovering from the interrupt routine in the register.

Upon receipt of the predetermined trigger signal, the switching control unit 131 may switch the I/O signal line from the first flash memory 120A to the second flash memory 120B. Further, the access control unit 140 may stop provision of the enable signal ENA 1 to the first flash memory 120A and restart provision of the enable signal ENA 2 to the second flash memory 120B which is in an idle state. Thus, provision of the clock CLK 2 to the second flash memory 120B may be restarted, and instructions of the interrupt routine according to the jump destination address may be sequentially read out from the second flash memory 120B immediately.

Upon detecting a return instruction indicating completion of the interrupt routine from the data sequence read out from the second flash memory 120B, the branch instruction detecting unit 132 may output a return signal to the PC monitoring unit 150. Upon receipt of the return signal, the PC monitoring unit 150 may output the return destination address value held in the register to the access control unit 140.

Upon receipt of the recovery destination address, the access control unit 140 may perform control so that a clock CLK 1 is provided to the first flash memory 120A by providing an enable signal ENA 1, and perform control so that a data sequence can be read out from a position of the return destination address of the first flash memory 120A. Upon receipt of, for example, a READY signal from the first flash memory 120A and detecting that the first flash memory 120A attains a state of being ready for read-out operation, the access control unit 140 may put the first flash memory 120A into an idle state.

In the CPU 110, when the return instruction is decoded by the decoder 113, the return destination address value of the subroutine may be set at the value of the program counter 115 in accordance with the stack pointer. Thus, the PC monitoring unit 150 may detect that the return destination address value held in the register matches the value of the program counter 115, output a predetermined trigger signal to the switching control unit 131 and the access control unit 140 and then reset the content of the register.

Upon receipt of the predetermined trigger signal, the switching control unit 131 may switch the I/O signal line from the second flash memory 120B to the first flash memory 120A. Further, the access control unit 140 may stop provision of the enable signal ENA 2 to the second flash memory 120B and restart provision of the enable signal ENA 1 to the first flash memory 120A which is in an idle state. Thus, provision of the clock CLK 1 to the first flash memory 120A may be restarted, and instructions according to the return address may be sequentially read out from the first flash memory 120A immediately.

As described above, according to the present embodiment, the same advantages or effects as those in the above-described first and second embodiments may be provided. Among others, according to the present embodiment, for example, two flash memories which store instruction codes and which can be selectively switched may be provided, and when the interrupt controller 160 may detect an interrupt to the CPU, the access control unit 140 may perform preparation of read-out from another flash memory in response to this, so that the subsequent instruction may be read out from the other flash memory immediately at the time point at which the CPU 110 may execute the operation of the instruction regarding the interrupt. Further, according to the present embodiment, the return instruction may be detected before the CPU 110 may executes the operation, and read-out operation from the original flash memory may be prepared in response to this, so that the subsequent instruction may be read out from the position of the return destination address of the other flash memory immediately at the time point at which the CPU 110 may execute the operation of the return instruction.

The above-described embodiments are merely examples for explaining the present invention and are not intended to limit the present invention. The present invention can be achieved in various forms without departing from the scope of the present invention. For example, while in the present embodiments, control is performed so that two flash memories are selectively switched, the present invention is not limited to this. For example, in a case where a plurality of branch routines create a nested structure, a plurality of instructions constituting the respective plurality of branch routines may be stored in different flash memories, and control may be performed so that these flash memories are switched as appropriate.

Further, in the method disclosed in the present specification, steps, actions, or functions may be implemented in parallel or in a different order, to the extent that there is no inconsistency in the results. The steps, actions, and functions have been described as examples, and some of the steps, actions, and functions may be omitted or combined, or other steps, actions or functions may be added within the scope of the present invention.

Further, while various embodiments have been disclosed in the present specification, a specific feature (technical matter) in one embodiment can be appropriately modified and added to another embodiment, or such a specific feature in one embodiment can be replaced by a specific feature in the other embodiment. Such embodiments are also included in the scope of the present invention.

The present invention can be widely utilized in a field of semiconductor devices.

What is claimed is:
1. A semiconductor device comprising:
a first flash memory configured to store a plurality of first instructions;
a second flash memory configured to store a plurality of second instructions to be executed according to a predetermined control instruction included in the first instructions;
an access control unit configured to control access to the first flash memory and the second flash memory;
a memory interface configured to select one of the first flash memory and the second flash memory and to provide a CPU with an instruction which is sequentially read out from the selected flash memory, wherein the memory interface further comprises an instruction detecting unit configured to determine whether the instruction is a first control instruction, and, when determined to be the first control instruction, acquire a first jump destination address value indicated by the first control instruction; and
a program counter monitoring unit configured to compare a value of a program counter of the CPU with the first jump destination address value acquired by the instruction detecting unit and to output a first trigger signal when, as a result of the comparison, the value of the program counter matches the first jump destination address value,
wherein the access control unit performs control so as to put the second flash memory into a state of being ready for read-out operation in accordance with the first jump destination address value acquired by the instruction detecting unit, and wherein the memory interface selects the second flash memory based on the first trigger signal output from the program counter monitoring unit.

2. The semiconductor device according to claim 1, wherein the program counter monitoring unit compares the value of the program counter with the first jump destination address value, when the value of the program counter is rewritten to a value other than a predetermined increment value.

3. The semiconductor device according to claim 2, wherein the program counter monitoring unit includes a register to store the acquired first jump destination address value.

4. The semiconductor device according to claim 3, wherein the program counter monitoring unit performs control, such that the CPU is put into a hold state when the value of the program counter is rewritten to a value other than the predetermined increment value and a content of the register is null or void.

5. The semiconductor device according to claim 4, wherein the program counter monitoring unit performs control such that the CPU is released from the hold state when the second flash memory is in a state of being ready for read-out operation in accordance with an instruction decoded by the CPU.

6. The semiconductor device according to claim 1, wherein the access control unit performs control, such that the second flash memory is put into an idle state until the access control unit receives the first trigger signal, when the second flash memory attains the state of being ready for read-out operation.

7. The semiconductor device according to claim 1,
wherein the instruction detecting unit determines whether an instruction is a second instruction, while the plurality of instructions are read out from the second flash memory, and acquires a second jump destination address value indicated by the second instruction, if the instruction is determined to be the second instruction, wherein the access control unit performs control, such that the first flash memory attains a state of being ready for read-out operation in accordance with the second jump destination address value acquired by the instruction detecting unit, wherein the program counter monitoring unit compares the value of the program counter with the second jump destination address value acquired by the instruction detecting unit, and outputs a second trigger signal when, as a result of the comparison, the value of the program counter matches the second jump destination address value, and wherein the memory interface selects the first flash memory based on the second trigger signal output from the program counter monitoring unit.

8. The semiconductor device according to claim 1, further comprising:
an interrupt controller configured to issue an interrupt to the CPU in response to an interrupt request signal from at least one of an external peripheral circuit and peripheral equipment, wherein the interrupt controller acquires an interrupt jump destination address value according to the interrupt based on the interrupt request signal, wherein the access control unit performs control such that the second flash memory attains a state of being ready for read-out operation in accordance with the interrupt jump destination address value acquired by the interrupt controller, wherein the program counter monitoring unit compares the value of the program counter with the interrupt jump destination address value acquired by the interrupt controller, and outputs the first trigger signal when, as a result of the comparison, the value of the program counter matches the interrupt jump destination address value, and wherein the memory interface selects the second flash memory based on the first trigger signal output from the program counter monitoring unit.

9. The semiconductor device according to claim 1, wherein each of the first flash memory and the second flash memory are a NOR serial flash memory.

10. A semiconductor device comprising:
a CPU;
a first flash memory configured to store a plurality of first instructions to be executed by the CPU; and
a second flash memory configured to store a plurality of second instructions to be executed in accordance with a predetermined control instruction included in the plurality of first instructions,
wherein the semiconductor device is configured to:
determine whether an instruction read out from the first flash memory is a branch instruction prior to execution of the instruction by the CPU, and perform control, such that the second flash memory reads out data in accordance with a branch destination address value indicated by the branch instruction, if it is determined that the instruction is a branch instruction, and
start reading out the plurality of second instructions from the second flash memory, if a value of a program counter of the CPU matches the branch destination address value during the state of being ready for read-out operation in accordance with the read-out control.

11. A control method for reading out instructions performed in a semiconductor device, the method comprising:
providing a first flash memory configured to store a plurality of first instructions to be executed by a CPU and a second flash memory configured to store a plurality of second instructions to be executed by the CPU, in accordance with a predetermined control instruction included in the plurality of first instructions;
selectively controlling the first flash memory and reading out the plurality of first instructions, so as to provide the plurality of first instructions to the CPU;
detecting the predetermined control instruction from among the plurality of first instructions during reading out of the plurality of first instructions;
acquiring a jump destination address value indicated by the predetermined control instruction, if the predetermined control instruction is detected;
performing control, such that a second flash memory attains a state of being ready for read-out operation in accordance with the acquired jump destination address value;
monitoring the program counter of the CPU upon acquisition of the jump destination address value to determine whether a value of the program counter matches the jump destination address value, if the jump destination address value is acquired;
outputting a predetermined trigger signal, if it is determined that the value of the program counter matches the jump destination address value; and switching, based on the predetermined trigger signal, read-out operation of instructions to be provided to the CPU from the first flash memory to the second flash memory, which is in the state of being ready for read-out operation.

\* \* \* \* \*